C. W. EISENMANN.
MAGNETIC COMPASS.
APPLICATION FILED APR. 19, 1920.
1,380,949.
Patented June 7, 1921.
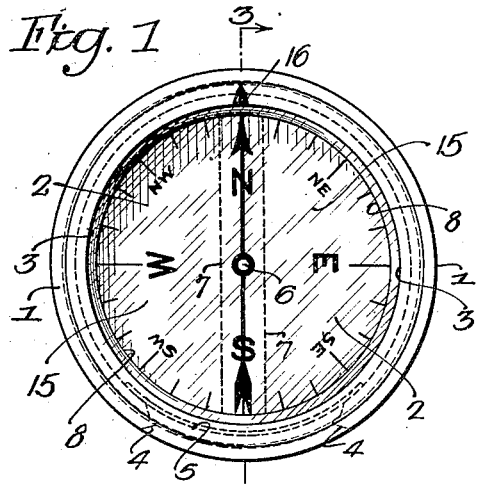
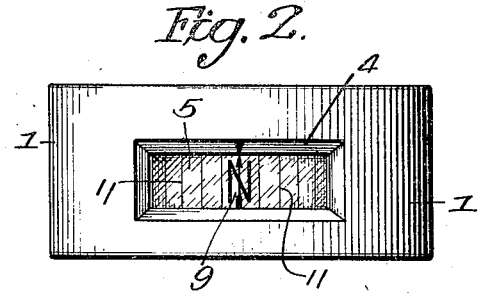
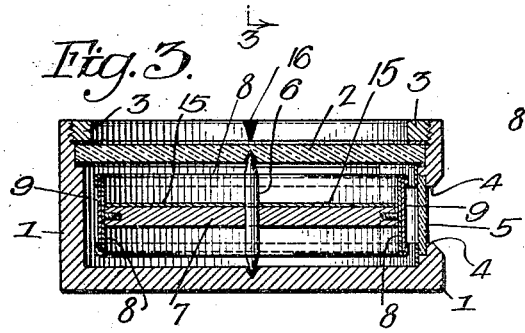
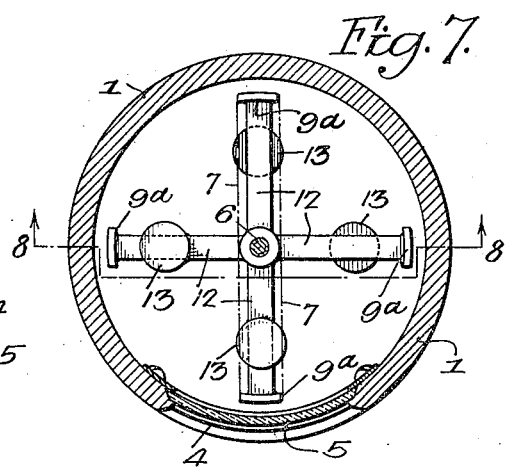
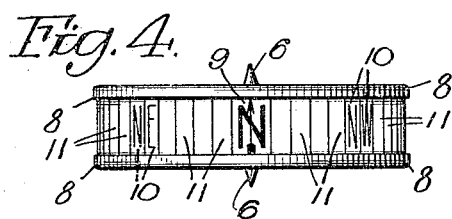
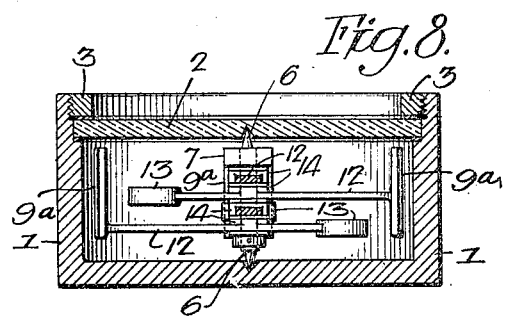
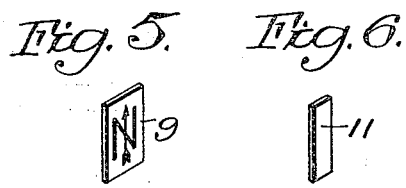
Inventor
Carl W. Eisenmann
by his Attorneys
Howson & Howson

UNITED STATES PATENT OFFICE.

CARL W. EISENMANN, OF NEBRASKA CITY, NEBRASKA.

MAGNETIC COMPASS.

1,380,949. Specification of Letters Patent. Patented June 7, 1921.

Application filed April 19, 1920. Serial No. 374,909.

*To all whom it may concern:*

Be it known that I, CARL W. EISENMANN, a citizen of the United States, residing in Nebraska City, Nebraska, have invented Magnetic Compasses, of which the following is a specification.

This invention relates to a magnetic compass of the type in which the indicating element is visible from the side of the instrument through a window or opening in its inclosing casing.

An object of said invention is to provide a novel construction and mounting for said indicating elements which shall permit of their adjustment relative to the magnet or needle of the compass.

It is further desired to provide a magnetic compass of the type above indicated which shall be particularly adapted for use in motor vehicles and whose construction shall be such as to permit of its indicating members being adjusted without disturbing the balance of the rotatable element, in order to correct the instrument for errors due to the presence of magnets or magnetic structures.

These objects and other advantageous ends I attain as hereinafter set forth, reference being had to the accompanying drawings, in which, Figures 1 and 2 are respectively a plan and a side elevation of a magnetic compass constructed in accordance with my invention;

Fig. 3 is a transverse vertical section on the line 3—3, Fig. 1;

Fig. 4 is a side elevation of the movable portion of the compass;

Figs. 5 and 6 are perspective views of one of the indicating letters and one of the spacing blanks used in that form of the invention shown in Figs. 1 and 3;

Fig. 7 is a horizontal section taken through the containing casing of a slightly modified form of my invention;

Fig. 8 is a vertical section on the line 8—8, Fig. 7; and

Fig. 9 is a perspective view of one of the balance indicating elements used in that form of the invention shown in Figs. 7 and 8.

In Figs. 1 to 6 of the above drawings 1 represents a containing casing in the form of a shallow cylinder closed at the bottom and having a top opening normally closed by a circular plate 2 which may be of glass, removably held in position to close the open top of the casing by a retaining ring 3 threaded into the latter. An opening of suitable dimensions and usually of rectangular outline is formed in the side of the casing as indicated at 4 and this is closed by a transparent window 5 held in position by any suitable means.

Axially mounted within the casing is a staff or spindle 6 having pointed ends respectively journaled in the bottom of the casing and in the cover 2 and having rigidly fixed to it a magnetic member or needle in the form of a horizontally elongated bar 7 supported to rotate in a plane about midway between the cover 2 and the bottom of the casing.

This needle has fixed to it and serves to support a ring 8 whose edges are turned over to provide an annular retainer or guideway in which are mounted a series of cards or plates 9 bearing the letters N, E, S and W to indicate the cardinal points of the compass, any number of cards or plates 10 bearing letters to indicate those points of the compass intermediate those for the four main points, and a number of sets of blank cards 11 which like the cards or plates 10 are preferably of a width equal to half the width of the cards 9. The widths of all of said sets of cards are so proportioned that there are for example four of the blank cards 11 between each of the main plates 9 and the adjacent intermediate plates 10 and it will be understood that said plates 9 and 10 are so positioned in the guideway formed by the flanged ring 8 that under the action of the magnetic needle 7 the letter N may be visible through the window 5 and in the middle of the opening 4 when the car or other movable structure upon which the compass is mounted is headed or pointed due north. If desired a card 15 appropriately marked as in Fig. 1, may be mounted on the needle 7 so that it is visible through the glass cover 2, its graduations and letters coöperating with an index mark 16 in the usual manner well known in this art.

If after the compass be mounted upon a motor vehicle, aeroplane, or other moving structure, it should be found that owing to the presence of magnets or bodies of iron or steel the indications of the instrument were incorrect, the observed error could be corrected by shifting one or more of the blank cards 11 from one side to the other of each of the indicating cards until the letters on the latter as observed through the window 5, were correct under conditions of operation of the car or other structure on which the compass was mounted.

In that form of my invention shown in Figs. 7 to 9 inclusive I mount as before a spindle 6 axially of the casing and in this instance fix to it the magnetic needle or bar 7 preferably adjacent its upper end. Below said needle I adjustably mount on the staff 6 a suitable number of arms 12 each of which carries at one end an indicating plate 9ª and at the opposite end a counter weight 13 which perfectly balances said plate.

These arms are perforated or provided with hubs 14 for the staff 6 which in the simple form of my invention may be frictionally engaged by the nut to permit of their rotative adjustment thereon relatively to the magnetic needle 7, in order that the proper one of the plates 9ª may be visible through the window 5 to cause the instrument to correctly indicate the direction in which the vehicle or other structure in which the instrument is mounted may be headed at any given time. In this form of my invention as in that shown in Figs. 1 to 6 the indicating plates may be adjusted relatively to the magnetic element 7 without disturbing the balance of the movable structure or in any way interfering with its proper operation. When any one of the arms 12 requires adjustment it is forcibly turned on the spindle 6 until it gives the proper indications of the direction in which the vehicle carrying it is headed.

I claim:

1. The combination in a magnetic compass of an opaque casing having a side window opening; a transparent closure for said opening; a magnetic element rotatably mounted in the casing; with indicating elements projecting at right angles to the plane of and movable with said magnetic element, said indicating elements being angularly adjustable relative to the magnetic element and separably visible through the closure of the window opening.

2. The combination in a magnetic compass of a casing; a staff rotatably mounted in said casing; a magnetic element on the staff; a ring carried by the staff; and indicating elements adjustably mounted on the ring.

3. The combination in a magnetic compass of a casing having a window; a staff rotatably mounted in said casing, a magnetic element on the staff; a ring carried by the staff; and indicating elements separately visible through the window, and slidably mounted on the ring to permit of their adjustment relatively to the magnetic element.

4. The combination in a magnetic compass of a casing having a side window; a staff rotatably mounted in the casing; a magnetic element and a ring carried by the staff, said ring having its edges flanged to provide an annular guideway; and indicating plates slidably mounted in the guideway and separately visible through the window of the casing.

5. The combination in a magnetic compass of a casing having a side window; a staff rotatably mounted in the casing; a magnetic element and a ring carried by the staff, said ring having its edges flanged to provide an annular guideway; indicating plates slidably mounted in the guideway and separately visible through the window of the casing; and blank plates interposed between the indicating plates.

CARL W. EISENMANN.